Patented May 25, 1954

2,679,538

UNITED STATES PATENT OFFICE 2,679,538

PRODUCTION OF CHLORO-2,4,6-TRINITRO-BENZENES

Henry Feuer, West Lafayette, Ind., and Arthur A. Harban, Lansing, Ill., assignors to Purdue Research Foundation, West Lafayette, Ind., a corporation of Indiana No Drawing. Application May 1, 1951,
Serial No. 224,053

6 Claims. (Cl. 260—646)

The present invention relates to processes for the production of 2,4,6-trinitrochlorobenzenes and particularly to the production of 2,4,6-trinitrochlorobenzene and chloropicryl chloride (1,3-dichloro-2,4,6-trinitrobenzenes) from picric acid and styphnic acid (2,4,6-trinitroresorcinol), respectively.

Heretofore picryl chloride (2,4,6-trinitrochlorobenzene) had been produced in good yields by contacting an excess of phosgene ($COCl_2$) with dry pyridine picrate (Boyer, Spencer and Wright, Canadian J. Research, 1946, vol. 24, section B, pages 200–203). When such a process was applied to the pyridine salt of styphnic acid (2,4,6-trinitroresorcinol), an explosion resulted.

Since many nitro compounds of this type are explosive, the principal object of this invention is to provide a process for the preparation of picryl chloride and related compounds in which the danger of explosion is greatly reduced or completely obviated. A further object of the present invention is to provide a process for the production of chloropicryl chloride from phosgene and 2,4,6-trinitroresorcinol. Other objects and advantages of the invention, some of which are set forth more specifically hereinafter, will be apparent to those skilled in the art to which the invention pertains.

We discovered that chloropicryl chloride is produced in good yield and without danger of explosion by passing phosgene into a solution or suspension of the pyridine salt of styphnic acid in acetone or a similar solvent. The solvent appears to possess some specificity and profoundly influences the reaction, since benzene, the solvent which has been used for the reaction of pyridinium picrate with phosphorus oxychloride to produce picryl chloride (Boyer, Spencer and Wright, loc. cit.), is not usable in this process, nor is dioxane, since the desired product is not obtained where either of these solvents are used.

In its broader aspects, the process of our invention comprises the reaction of phosgene with an amine salt, particularly a pyridine salt, of a 2,4,6-trinitrophenol conforming to the following general formula:

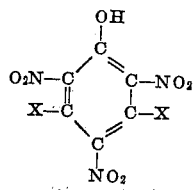

in which X is a radical of the group consisting of hydrogen, alkyl, hydroxyl and the halogens, and both X's may be the same or different radicals of this group. It is not necessary that all of the hydroxyl radicals of the 2,4,6-trinitrophenol be combined in the form of a salt with pyridine or other amine since the monopyridine salt of 2,4,6-trinitroresorcinol is apparently as useful as dipyridinium styphnate (the dipyridinium salt of 2,4,6-trinitro-1,3-dihydroxybenzene), which is relatively unstable and is converted to the monopyridinium salt (see Preparation 2 hereinafter). Dimethylaniline salts and salts of other secondary amines which are acceptors of hydrogen chloride are apparently equally as effective as pyridine salts.

The reaction involved in the process of our invention consists essentially in the replacement of one or more of the hydroxyl groups of the 2,4,6-trinitrophenol by chlorine. The pyridine salt of styphnic acid, for example, produces both the dichloro derivative (chloropicryl chloride with no hydroxyl radical) as well as the monochloro derivative (chloropicric acid, 3-chloro-2,4,6-trinitrophenol, with one hydroxyl radical). The reaction of styphnic acid may be represented in two steps as:

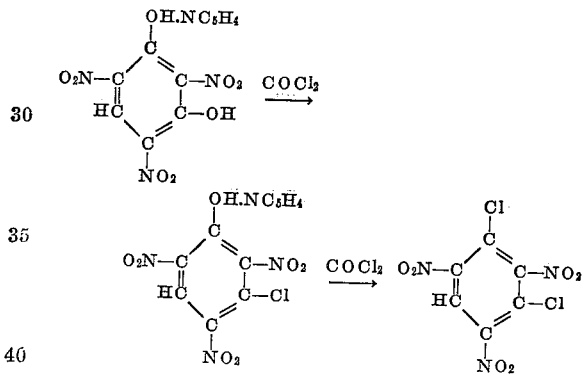

The chloropicric acid, which may be recovered as described in Example 2 hereinafter, may be further treated with phosgene as described in Example 4 hereinafter, to increase the overall yield of chloropicryl chloride in the process. 2,4,6-trinitrophenols which may be converted in accordance with the process of our invention to compounds in which one or more of the hydroxyl radicals are replaced by chlorine radicals and in which the nitro, hydrogen, alkyl or halogen radicals already present are unaffected, are picric acid (2,4,6-trinitro-1-hydroxybenzene), styphnic acid (2,4,6-trinitro-1,3-dihydroxy-benzene), trinitrophloroglucinol (2,4,6-trinitro-1,3,5-trihydroxybenzene), 3 - chloro - 2,4,6-trinitrophenol, 3-bromo-2,4,6-trinitrophenol, 3,5-dibromo-2,4,6-trinitrophenol, 2,4,6 - trinitro-m-cresol (2,4,6-trinitro-3-hydroxy-1-methylbenzene) and similar compounds. The pyridine, dimethylaniline, and other amine salts of these phenols for use in the process may be prepared in conventional manner, including addition of pyridine directly to the phenol in stoichiometric amounts or with pyridine in excess (see Preparation 1 hereinafter) or, as in the case of pyridinium picrate (Boyer, Spencer and Wright, loc. cit.), by combination of the ingredients in ethanol. In the case of 2,4,6-trinitroresorcinol, either the monopyridium salt or the dipyridium salt may be prepared and used.

In conducting the process of our invention the pyridine salt of the 2,4,6-trinitrophenol is dissolved or suspended in an aliphatic ketone solvent such as acetone or methyl ethyl ketone. The quantity of solvent is not critical but it should be sufficient to give a workable suspension and may be as great as to give complete solution. Since the solvent reacts to a small extent with the phosgene, the minimum amount consistent with ease of operation is preferred. Phosgene is then introduced into the solution or suspension, which is maintained at a temperature within the range of 30 to 60 degrees centigrade. At higher temperatures, the side reactions with phosgene and ketone solvents become excessive and isolation of chloropicryl chloride from the reaction mixture is difficult.

Phosgene should be introduced in an amount in excess of that required stoichiometrically for the reaction, the preferred optimum being approximately 1.5 mole for each mole hydroxyl radical, for example, 3 moles of phosgene for each mole of pyridinium styphnate (which has two replaceable hydroxyl radicals).

The resulting 2,4,6-trinitrochlorobenzene is recovered from the reaction mixture in conventional manner. Typical methods which may be used are illustrated in the examples which follow hereinafter.

PREPARATION 1.—PREPARATION OF MONOPYRIDINIUM STYPHNATE

To 10.0 grams (0.041 mole) of styphnic acid (2,4,6-trinitroresorcinol) was added 75 milliliters of pyridine and the yellow precipitate which formed was filtered off, washed with ether, and dried. Approximately 92.5 per cent of the theoretical yield of the monopyridinium salt of styphenic acid was thus obtained.

PREPARATION 2.—PREPARATION OF DIPYRIDINIUM STYPHNATE

To 50 grams (0.20 mole) of dry styphnic acid was added 200 grams (2.53 moles) of pyridine. The thick slurry which formed was stirred until the reaction was complete. The excess pyridine was filtered off and the yellow product was washed with ether. After drying, 77 grams (93.8%) of salt was obtained. This was the dipyridinium salt of styphnic acid and had a melting point of 173–176 degrees centigrade. Its neutral equivalent was found to be 198.2; the neutral equivalent calculated for $C_{16}H_{13}O_8N_5$ is 201.6. When the salt was heated at 60 degrees centigrade for eight days, it was converted quantitatively into the monopyridinium styphnate (cf. Hoo, Mah and Sah, Science Reports Nat. Tsinghau Univ., 1933, vol. 2, page 191; abstracted in Chem. Abs., 1934, vol. 28, column 3692). The melting point of monopyridinium styphnate is 184.5–185.5 degrees centigrade. 2,4,6-trinitroresorcinol (styphnic acid) was prepared by sulfonation and subsequent nitration of resorcinol in accordance with the method of Sah (Science Reports Nat. Tsinghau Univ., 1932, vol. 1, page 197; abstracted in Chem. Abs., 1932, vol. 26, page 5927). The product obtained in this manner has a melting point of 174–176 degrees centigrade.

Example 1.—Preparation of 1,3-dichloro-2,4,6-trinitrobenzene (chloropicryl chloride)

A suspension of 279.5 grams (0.86 mole) of pyridinium styphnate (Preparation 1) in two liters of acetone was prepared in a three-necked flask provided with thermometer, stirrer and gas inlet tube. The suspension was heated to 35 degrees centigrade and held at this temperature by cooling while 295 grams (2.97 moles) of phosgene ($COCl_2$) was introduced over a period of 8.8 hours. The solution was allowed to come to 23 degrees centigrade and stand for 22 hours. It was then placed in a separatory funnel attached to a flask of boiling water through which steam was passed. The solution was run into this flask at a rate such that the acetone solvent distilled over as fast as it was introduced. When all of the solvent had been stripped off in this manner, the residue in the flask was cooled and the crystalline material which had formed was filtered off and dried. This material was then leached with several portions of warm benzene. The residue from the benzene leaching process amounted to 26 grams containing a mixture of pyridinium styphnate and pyridinium choloropicrate. The benzene extract was evaporated to dryness to give chloropicryl chloride. This was further purified by recrystallization from a mixture containing equal parts of ethanol and chloroform. A total of 166.5 grams (68.5% of the stoichiometric yield was obtained. The chloropicryl chloride thus obtained had a melting point of 126.5–127 degrees centigrade, which agreed closely to the melting point of 128 degrees centigrade reported by Sudborough and Picton, J. Chem. Soc., 1906, vol. 89, page 591, for the compound.

The α-naphthylamine addition compound of the chloropicryl chloride thus obtained was formed and it had a melting point of 125–127 degrees centigrade that was identical with the previously reported value of Sudborough and Picton, loc. cit.

Treatment of the chloropicryl chloride with gaseous ammonia in alcohol yielded 2,4,6-trinitro-1,3-benzenediamine, having a melting point of 275–277 degrees centigrade. The melting point of this compound that was previously reported by Korner and Contardi (Atti. Acad. Lincei, 1908, vol. 17, part I, page 473) is 275 degrees centigrade.

Example 2.—Recovery of chloropicric acid from the products of Example 1

The benzene-insoluble residue obtained in the preparation and purification of chloropicryl chloride in Example 1 was recrystallized from acetone and dissolved in a 1.5 percent aqueous sodium hydroxide solution. The deep-red-colored solution that resulted was distilled to dryness at subatmospheric pressure. The distillate contained pyridine, which was identified by the preparation of its styphnic acid salt. The residue in the flask was dissolved in 20 milliliters of water and acidified with dilute sulfuric acid to give crystals which upon crystallization from carbon tetrachloride melted at 113–113.5 degrees centigrade. These crystals were chloropicric acid which had previously been reported by Hodgson and Moore, J. Chem. Soc., 1925, vol. 127, page 1603, to have a melting point of 114 degrees centigrade. The determination of chlorine yielded a value of 13.30 percent which agrees closely with the value of 13.45 percent chlorine calculated for $C_6H_2O_7N_3Cl$ (chloropicric acid).

The identity with chloropicric acid was further established by converting the compound with gaseous ammonia to 3-amino-2,4,6-trinitrophenol, which had a melting point of 222–223 degrees centigrade (corrected); melting point previously reported for this compound by Blanksma, Rec. trav. chim., 1902, vol. 21, page 259, is 219 degrees centigrade (uncorrected).

A portion of the chloropicric acid that was obtained in this example was converted with pyridine to the pyridinium salt, which melted at 159–161 degrees centigrade. When mixed with some of the original material, the melting point of the mixture remained the same and no perceptible depression resulted.

*Example 3.—Preparation of 1,3-dichloro-2,4,6-trinitrobenzene (chloropicryl chloride)*

A solution of 15.2 grams (0.043 mole) of pyridinium styphnate in 225 milliliters of hot acetone was placed in a 250-milliliter three-necked flask equipped as described in Example 1, with a stirrer, thermometer, reflux condenser and gas inlet tube. Phosgene was bubbled into the solution for 3 hours while it was maintained at a temperature of approximately 52 degrees centigrade and the mixture was heated at reflux for an additional 2 hours and allowed to stand at room temperature for 12 hours. At the end of that time a clear, deep-red-colored solution with an ester-like odor remained. This solution was added dropwise to 2 liters of ice water and the brown crystalline material which precipitated was filtered off and dried. Approximately 7.4 grams (0.026 mole) of crude chloropicryl chloride having a melting point of 121–127 degrees centigrade was obtained. On recrystallization from aqueous acetone, the melting point was raised to 125–129 degrees centigrade. The product conformed substantially to that of Example 1, but the yield was only approximately 61 percent of the stoichiometric.

*Example 4.—Preparation of chloropicryl chloride from pyridinium chloropicrate*

An excess of phosgene was slowly bubbled during the course of 6 hours into a suspension of 10.9 grams (0.032 mole) of pyridinium chloropicrate (obtained as in Example 2) that was suspended in 100 milliliters of acetone contained in a 200-milliliter three-necked flask fitted with a thermometer and inlet and outlet tubes that was maintained at a temperature between 30 and 40 degrees centigrade by means of a steam cone. The mixture was then allowed to stand for 15 hours, during which time the acetone evaporated. To the solid residue was added 150 millimeters of water and the mixture was heated at approximately 80 degrees centigrade for about 2 to 3 hours, to destroy any remaining phosgene. The solid was filtered off and extracted with two 200-milliliter portions of carbon tetrachloride. From the extracts, chloropicryl chloride having a melting point of 127–128 degrees centigrade was obtained. Concentration and cooling of the aqueous filtrate yielded an additional amount of chloropicryl chloride, which brought the total to 6.35 grams, representing a yield corresponding to 71 per cent of the theoretical.

PREPARATION 3.—DIMETHYLANILINIUM STYPHNATE

Twenty grams (0.081 mole) of styphnic acid was dissolved in 75 milliliters of acetone and 19.7 grams (0.0163 mole) of dimethylaniline was added to the solution. The golden yellow precipitate which formed was filtered off, washed with ether, and dried on the filter. The yield was 28.0 grams which corresponds to 93.8 percent of the theoretical yield expected from the reaction of equimolecular proportions of styphnic acid and dimethylaniline. The neutral equivalent of the dimethylanilium styphnate that was thus obtained was 182, which agrees closely with the calculated neutral equivalent of 183 for the compound.

*Example 5.—Preparation of chloropicryl chloride from dimethylanilinium styphnate*

Through a stirred suspension of 28 grams (0.0765 mole) of dimethylanilinium styphnate (Preparation 3) in 400 milliliters of acetone maintained at a temperature between 35 and 40 degrees centigrade, during a period of approximately 3 hours 40 minutes, was bubbled 41.0 grams (0.415 mole) of phosgene. The acetone was then removed from the mixture by steam distillation and the distillate was discarded. The residue was filtered and 15.8 grams of a black semicrystalline solid was thereby separated from the aqueous suspension. The filtrate was discarded and the solid product was extracted with 300 milliliters of warm benzene. The extract was evaporated to dryness, yielding 12.1 grams of crude chloropicryl chloride having a melting point of 123–126 degrees centigrade. Upon recrystallization of the product from a mixture of ethanol and chloroform, a purified product having a melting point of 127.5–128 degrees centigrade resulted.

Inasmuch as the foregoing specification comprises preferred embodiments of the invention it is to be understood that the invention is not limited thereto and that modifications and alterations may be made in conventional manner in the processes described without departing from the invention or the scope of the appended claims.

We claim:

1. A process for the production of a chloro-2,4,6-trinitrobenzene which comprises contacting phosgene with a salt of a hydrogen-chloride-accepting amine and a 2,4,6-trinitrophenol conforming to the general formula

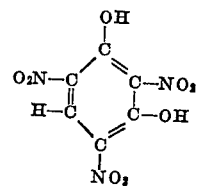

that is distributed in an aliphatic ketone, at a temperature within the range of approximately 30 to approximately 60 degrees centigrade, and subsequently recovering the chloro-2,4,6-trinitrobenzene.

2. A process for the production of a chloro-2,4,6-trinitrobenzene which comprises contacting phosgene with a pyridine salt of a 2,4,6-trinitrophenol conforming to the general formula

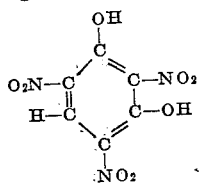

that is distributed in an aliphatic ketone, at a temperature within the range of approximately 30 to approximately 60 degrees centigrade, and subsequently recovering the resulting chloro-2,4,6-trinitrobenzene.

3. A process as defined in claim 1 in which the amine salt used is a dimethylaniline salt of the specified 2,4,6-trinitroresorcinol.

4. A process as defined in claim 1 in which the aliphatic ketone is a solvent of the group consisting of acetone and methyl ethyl ketone.

5. A process for the production of chloropicryl chloride which comprises contacting a suspension of a pyridine salt of 2,4,6-trinitroresorcinol in a solvent of the group consisting of acetone and methyl ethyl ketone at a temperature between approximately 30 and approximately 60 degrees centigrade with a stoichiometric excess of phosgene and subsequently recovering the resulting chloropicryl chloride.

6. A process for the production of chloropicryl chloride which comprises contacting a suspension of a dimethylaniline salt of 2,4,6-trinitroresorcinol in a solvent of the group consisting of acetone and methyl ethyl ketone at a temperature between approximately 30 and approximately 60 degrees centigrade with a stoichiometric excess of phosgene and subsequently recovering the resulting chloropicryl chloride.

References Cited in the file of this patent

Boyer et al., Canadian Jour. Research, vol. 24–B, pp. 200–203 (1946) (2 pages).

Hass et al., Jour. Amer. Chem. Soc., vol. 72, pp. 2282–2283 (May 1950) (2 pages).